United States Patent
Tirumalai et al.

(10) Patent No.: US 8,595,744 B2
(45) Date of Patent: Nov. 26, 2013

(54) ANTICIPATORY HELPER THREAD BASED CODE EXECUTION

(75) Inventors: Partha P. Tirumalai, Fremont, CA (US); Yonghong Song, Belmont, CA (US); Spiros Kalogeropulos, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 2009 days.

(21) Appl. No.: 11/436,948

(22) Filed: May 18, 2006

(65) Prior Publication Data

US 2007/0271565 A1    Nov. 22, 2007

(51) Int. Cl.
*G06F 9/46* (2006.01)

(52) U.S. Cl.
USPC .......................................................... 718/107

(58) Field of Classification Search
USPC .......................................................... 718/107
See application file for complete search history.

(56) References Cited

U.S. PATENT DOCUMENTS

| | | | |
|---|---|---|---|
| 6,651,246 B1 | 11/2003 | Archambault et al. | |
| 6,880,045 B2 | 4/2005 | Pong et al. | |
| 6,938,130 B2 | 8/2005 | Jacobson et al. | |
| 7,395,531 B2 | 7/2008 | Eichenberger et al. | |
| 7,530,069 B2 | 5/2009 | Kawahara et al. | |
| 2003/0079116 A1* | 4/2003 | Chaudlhry et al. | 712/235 |
| 2004/0194074 A1* | 9/2004 | Shibayama et al. | 717/151 |

OTHER PUBLICATIONS

Song, Y., et al; "Design and Implementation of a Compiler Framework for Helper Threading on Multi-Core Processors;" IEEE PACT 2005, (Sep. 2005); pp. 99-109.

Damron, P., et al; "Hybrid Transactional Memory"; ASPLOS XII; San Jose, CA (2006); http://www.princeton.edu/~asplos06/tprogram.html.

Su, E., et al; "Compiler Support of the Workqueuing Execution Model for Intel SMP Architectures"; Fourth European Workshop on OpenMP (EWOMP), (2002).

Zhong, H., et al; "Uncovering Hidden Loop Level Parallelism in Sequential Applications"; In Proc. Of the 14th International Symposium on High-Performance Computer Architecture; (2008).

* cited by examiner

*Primary Examiner* — Mengyao Zhe
(74) *Attorney, Agent, or Firm* — Rory D. Rankin; Meyertons, Hood, Kivlin, Kowert & Goetzel, P.C.

(57) ABSTRACT

A method and mechanism for using threads in a computing system. A multithreaded computing system is configured to execute a first thread and a second thread. Responsive to the first thread detecting a launch point for a function, the first thread is configured to provide an indication to the second thread that the second thread may begin execution of a given function. The launch point of the function precedes an actual call point of the function in an execution sequence. The second thread is configured to initiate execution of the function in response to the indication. The function includes one or more inputs and the second thread uses anticipated values for each of the one or more inputs. When the first thread reaches a call point for the function, the first thread is configured to use a results of the second thread's execution, in response to determining the anticipated values used by the second thread were correct.

20 Claims, 7 Drawing Sheets

ANTICIPATORY HELPER THREAD BASED CODE EXECUTION

BACKGROUND OF THE INVENTION

1. Field of the Invention

The invention relates to computing systems and, more particularly, to multithreaded processing systems.

2. Description of the Related Art

With the widening gap between processor and memory speeds, various techniques have arisen to improve application performance. One technique utilized to attempt to improve computing performance involves using "helper" threads. Generally speaking, a helper thread is a thread which is used to assist, or improve, the performance of a main thread. For example, a helper thread may be used to prefetch data into a cache. For example, such approaches are described in Yonghong Song, Spiros Kalogeropulos, Partha Tirumalai, "Design and Implementation of a Compiler Framework for Helper Threading on Multi-core Processors," pp. 99-109, 14th International Conference on Parallel Architectures and Compilation Techniques (PACT'05), 2005, the content of which is incorporated herein by reference. Currently, prefetching is generally most effective for memory access streams where future memory addresses can be easily predicted—such as by using loop index values. For such access streams, software prefetch instructions may be inserted into the program to bring data into cache before the data is required. Such a prefetching scheme in which prefetches are interleaved with the main computation is also called interleaved prefetching.

Although such prefetching may be successful for many cases, it may be less effective for two kinds of code. First, for code with complex array subscripts, memory access strides are often unknown at compile time. Prefetching in such code tends to incur excessive overhead as significant computation is required to compute future addresses. The complexity and overhead may also increase if the subscript evaluation involves loads that themselves must be prefetched and made speculative. One such example is an indexed array access. If the prefetched data is already in the cache, such large overheads can cause a significant slowdown. To avoid risking large penalties, modern production compilers often ignore such cases by default, or prefetch data speculatively, one or two cache lines ahead.

A second class of difficult code involves pointer-chasing. In this type of code, at least one memory access is needed to get the memory address in the next loop iteration. Interleaved prefetching is generally not able to handle such cases. While a variety of approaches have been proposed to attack pointer-chasing, none have been entirely successful.

In view of the above, effective methods and mechanisms for improving application performance using helper threads are desired.

SUMMARY OF THE INVENTION

Methods and mechanisms for utilizing helper threads in a multithreaded computing system are contemplated.

A method is contemplated wherein a helper thread is utilized in a second core or logical processor in a multi-threaded system to improve the performance of a main thread. In one embodiment, a helper thread executes in parallel with the main thread that it attempts to accelerate. Responsive to the first thread detecting a launch point for a given function call, the first thread is-configured to provide an indication to the second thread that the second thread may begin execution of the given function call. The launch point of the function precedes the actual call point of the function in an execution sequence. The second thread may then initiate execution of the function in response to the indication. The function includes one or more inputs and the second thread uses anticipated values for each of the one or more inputs. When the first thread reaches the call point for the function, the first thread is configured to use a results of the second thread's execution, in response to determining the anticipated input values used by the second thread were correct. If the anticipated values used by the second thread were incorrect, the first thread may simply ignore any results produced by the second thread and begin execution of the function itself.

Also contemplated is determining the launch point by tracing each of the one or more inputs back in an execution sequence of the code and identifying individual launch points for each of the one or more inputs. In one embodiment, the individual launch points correspond to earlier points in the execution sequence wherein a value of a corresponding input when the first thread reaches a call point for the function is known with a desired degree of certainty. In one embodiment, a distance between a launch point for an input of a given function and a call point of the function is determined for each input. The input with the shortest distance may be selected as the launch point for the function.

Also contemplated is the second thread maintaining a status of execution of the function. Included in the status may be an identification of the function, an indication as to whether the second thread has completed execution of the function, values used for inputs of the function, and output results of the execution. In some embodiments, a first thread may forego any further consideration of the results if it determines the second thread has not completed execution of the function.

These and other embodiments, variations, and modifications will become apparent upon consideration of the following description and associated drawings.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Overview of Multithreaded Processor Architecture

Figure 1:
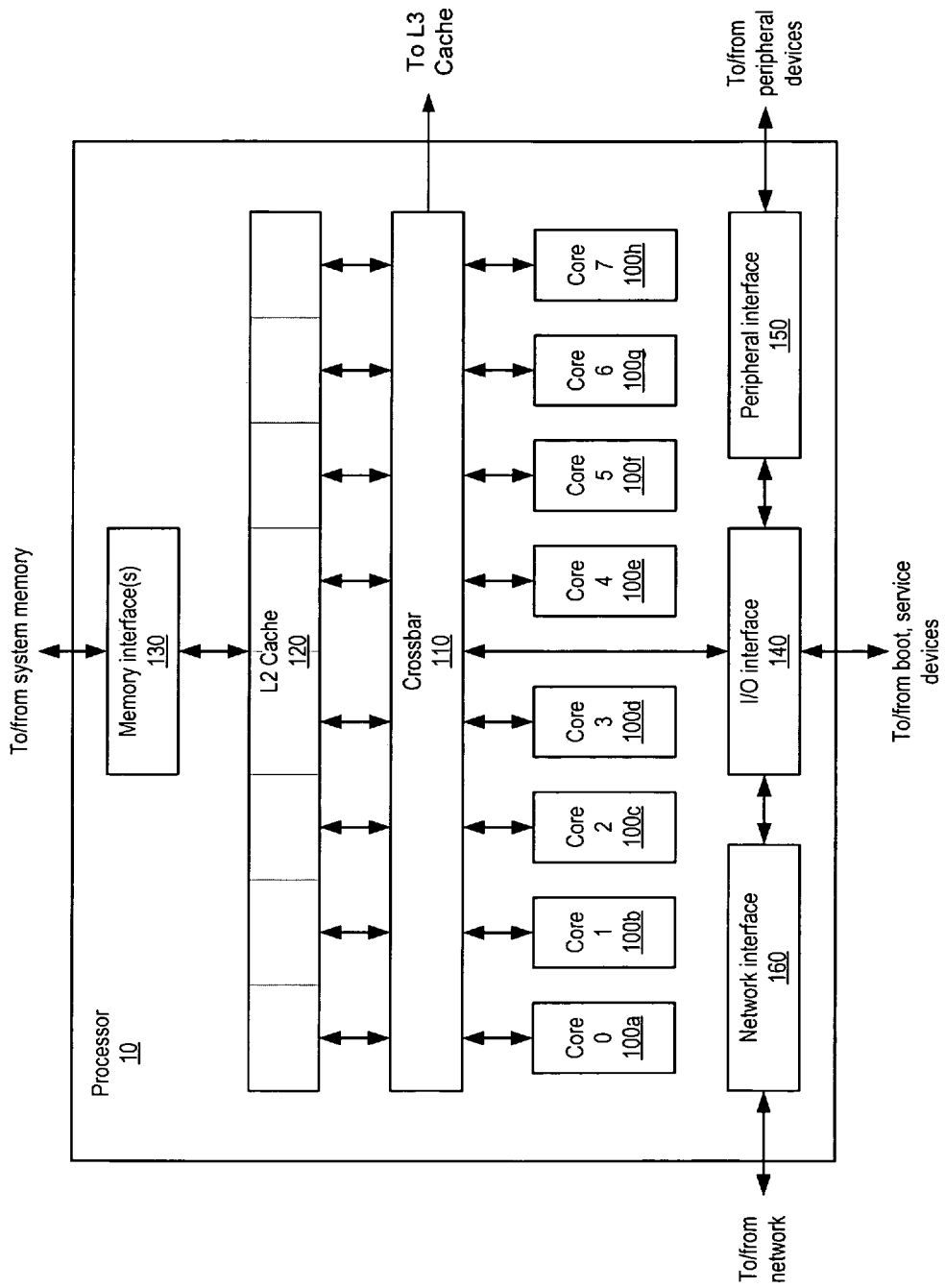
FIG. 1 is a block diagram illustrating one embodiment of a multi-threaded multi-core processor.

A block diagram illustrating one embodiment of a multi-threaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150, and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC V9 ISA, although in other embodiments it is contemplated that any desired ISA may be employed, such as x86 compatible ISAs, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.). In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any of the cores 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus DRAM (RDRAM), for example. (Rambus and RDRAM are registered trademarks of Rambus Inc.). In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express), although it is contemplated that any suitable interface standard or combination of standards may be employed. For example, in some embodiments peripheral interface 150 may be configured to implement a version of Universal Serial Bus (USB) protocol or IEEE 1394 protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

While the embodiment of FIG. 1 depicts a processor which includes eight cores, the methods and mechanisms described herein are not limited to such micro-architectures. For example, in one embodiment, a processor such as the Sun Microsystems UltraSPARC IV+ may be utilized. In one embodiment, the Ultra-SPARC IV+ processor has two on-chip cores and a shared on-chip L2 cache, and implements the 64-bit SPARC V9 instruction set architecture (ISA) with extensions. The UltraSPARC IV+ processor has two 4-issue in-order superscalar cores. Each core has its own first level (L1) instruction and data caches, both 64 KB. Each core also has its own instruction and data translation lookaside buffers (TLB's). The cores share an on-chip 2 MB level 2 (L2) unified cache. Also shared is a 32 MB off-chip dirty victim level 3 (L3) cache. The level 2 and level 3 caches can be configured to be in split or shared mode. In split mode, each core may allocate in only a portion of the cache. However, each core can read all of the cache. In shared mode, each core may allocate in all of the cache. For ease of discussion, reference may generally be made to such a two-core processor. However, it is to be understood that the methods and mechanisms described herein may be generally applicable to processors with any number of cores.

As discussed above, various approaches have been undertaken to improve application performance by using a helper thread to prefetch data for a main thread. Also discussed above, are some of the limitations of such approaches. In the following discussion, methods and mechanisms are described for better utilizing a helper thread(s). Generally speaking, it is noted that newer processor architectures may include multiple cores. However, it is not always the case that a given application executing on such a processor is able to utilize all of the processing cores in an effective manner. Consequently, one or more processing cores may be idle during execution. Given the likelihood that additional processing resources (i.e., one or more cores) will be available during execution, it may be desirable to take advantage of the one or more cores for execution of a helper thread. It is noted that while the discussion may generally refer to a single helper thread, those skilled in the art will appreciate that the methods and mechanisms described herein may include more than a single helper thread.

Figure 2:
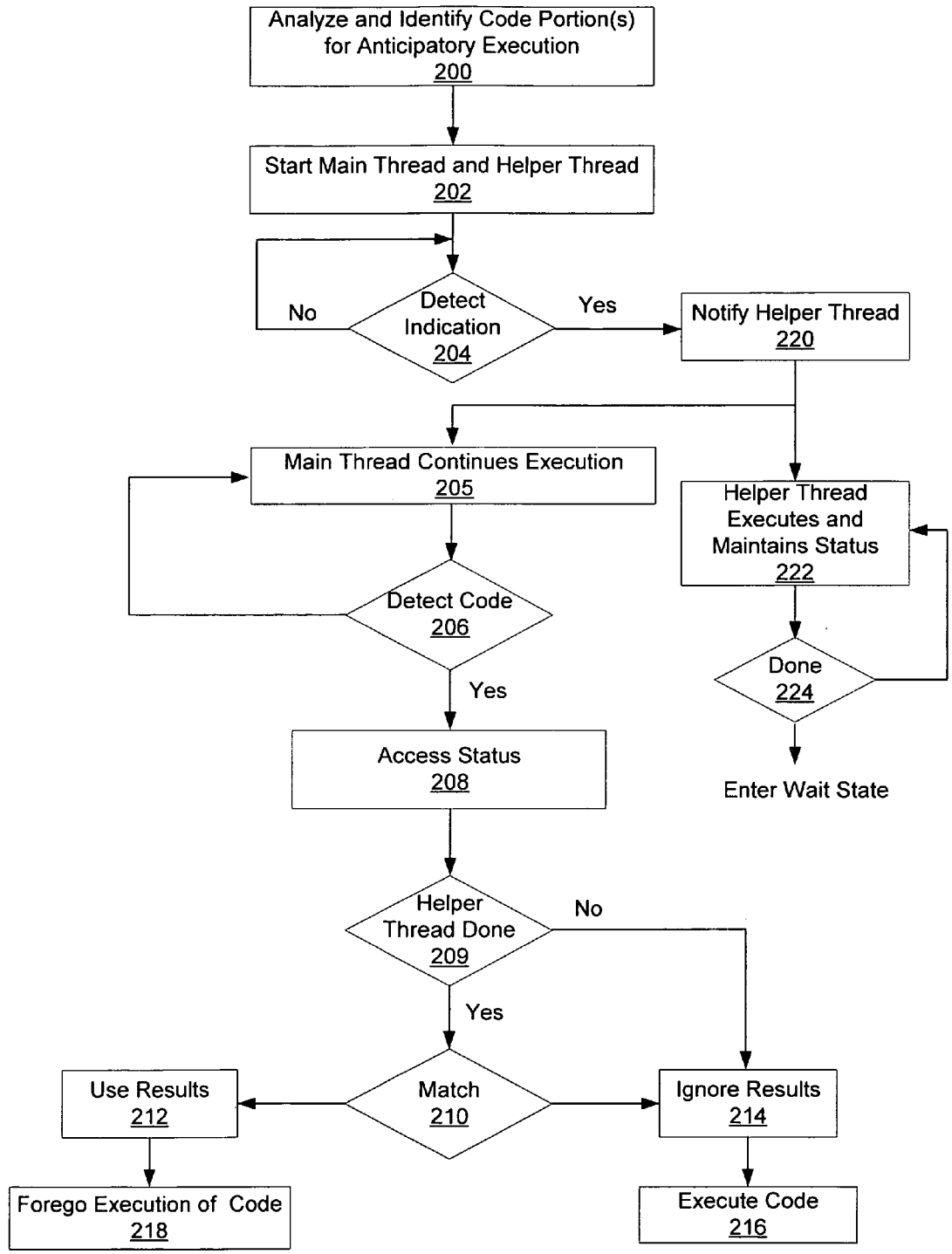
FIG. 2 depicts one embodiment of a method for utilizing anticipatorily executed code.

Turning now to FIG. 2, a general overview of one embodiment of a method for utilizing a helper thread is depicted. Generally speaking, helper (or "scout") threads may be utilized to execute selected instructions in an anticipatory manner in order to accelerate performance of another thread (e.g., a main thread). Generally speaking, a main thread spawns a helper thread which then waits for tasks to be assigned to it by the main thread. In one embodiment, the helper thread may share the same address space as the main thread. Further, in various embodiments, the helper thread may not be permitted to raise exceptions. When an identified launch point is reached by the main thread, the helper thread is activated with a pointer to the function which it is to execute. The helper then executes the function with anticipated/predicted input values. Upon completion, the helper thread writes the results in a shared buffer area. When the call point of the function is reached by the main thread, the main thread checks the shared buffer area to determine if the anticipated/predicted input values used by the helper thread match the correct values. If they match, then the main thread may simply use the results produced by the helper thread and continue execution. Otherwise, the main thread may simply ignore or discard the results produced by the helper thread and re-execute the function.

In the example shown, an initial analysis of the application code may be performed (block 200). In one embodiment, this analysis may generally be performed during compilation, though such analysis may be performed at other times as well. During analysis, selected portions of code are identified which may be executed by a helper thread during execution of the application. Such portions of code may comprise entire functions (functions, methods, procedures, etc.), portions of individual functions, multiple functions, or other instructions sequences. Subsequent to identifying such portions of code, the application code may be modified to include some type of indication that a helper thread may begin executing at least one of the identified portions. This indication will be provided prior to the time in execution that the identified portion would otherwise have been reached in an execution sequence (e.g., by a main thread). It is noted that while the term "thread" is generally used herein, a thread may refer to any of a variety of executable processes and is not intended to be limited to any particular type of process. Further, while multi-processing is described herein, other embodiments may perform multi-threading on a time-sliced basis or otherwise. All such embodiments are contemplated.

After modification of the code to support the helper thread(s), the application may be executed and both a main thread and a helper thread may be launched (block 202). It is noted that while the term "main" thread is used herein, a main thread may simply refer to a thread which is "helped" by a separate helper thread. Generally speaking, an initially launched helper thread may enter some type of wait state. In response to the main thread detecting an indication that a helper thread may begin executing (decision block 204), the main thread may then notify a helper thread (220) that it may begin execution of an identified portion of code. The helper thread may then initiate execution of the identified portion of code and maintain of status of such execution during execution. Also shown in FIG. 2 is the main thread continues execution (block 205) subsequent to notifying the helper thread. Accordingly, the helper thread may execute and maintain status (block 222) concurrent with continued execution of the main thread (block 205).

In one embodiment, the helper thread includes as a part of its maintained status, the value of any input or initial variables used in subsequent execution. For example, in the case of a function call, the helper thread may store an indication as to the value of any input variables of the function call when the helper thread begins execution of the function. These values stored for the inputs or other "initial" values may generally represent predictions or assumptions as to the actual values these variables will have when the corresponding code is reached during execution by the main thread. Further, the helper thread may store results of execution of the code as part of the status. The helper thread may also store an indication that indicates whether or not the helper thread has completed execution of the portion of code. In one embodiment, the helper thread may simply enter a wait state subsequent to completing execution of the identified portion of code (decision block 224).

During continued execution of the main thread (block 205), the previously identified portion of code may be reached. For example, as in the discussion above, a previously identified function call may be reached by the main thread. Responsive to detecting this point (decision block 206), the main thread may access the status (block 208) which corresponds to the portion of code (i.e., the function) which is being maintained by the helper thread. If in decision block 209 the status indicates the helper thread is not done (i.e., execution of the portion of code is not complete), the main thread may simply ignore any results produced by the helper thread (block 214) and continue with execution of the previously identified code (e.g., the function). In some embodiments, the helper thread may be configured to store partial results as it progresses with execution of a portion of code. Such partial results may be usable by a main thread in appropriate cases.

On the other hand, if the main thread determines the helper thread has completed execution of the code (decision block 209), the main thread may then examine the stored status to determine the initial values (e.g., input variables) the helper thread utilized in executing the code. As the main thread has reached the portion of code during its execution, the main thread knows the actual values of these initial variables. If the stored values match (decision block 210) the actual values held by the main thread, the main thread may determine that the helper thread used the "correct" values in its computation and the results of the helper thread's computation are correct as well. In such a case, the main thread uses the results stored by the helper thread (block 212) and foregoes execution of the portion of code which was executed by the helper thread (block 218). It is noted that in various embodiments, the input values used by the helper thread may not be predictions, but may be known to be unchanged. If the main thread detects this situation, the main thread may forego comparing the values of such inputs used by the helper thread to the actual values. Alternatively, if the main thread determines the initial (predicted) values stored by the helper thread do not match the actual values held by the main thread, the main thread may ignore any results produced by the helper thread (block 214), and execute the portion of code (block 216). In this manner, the main thread may in certain instances experience improved performance as it may have results of execution of identified portions of code determined in advance.

Figure 3:
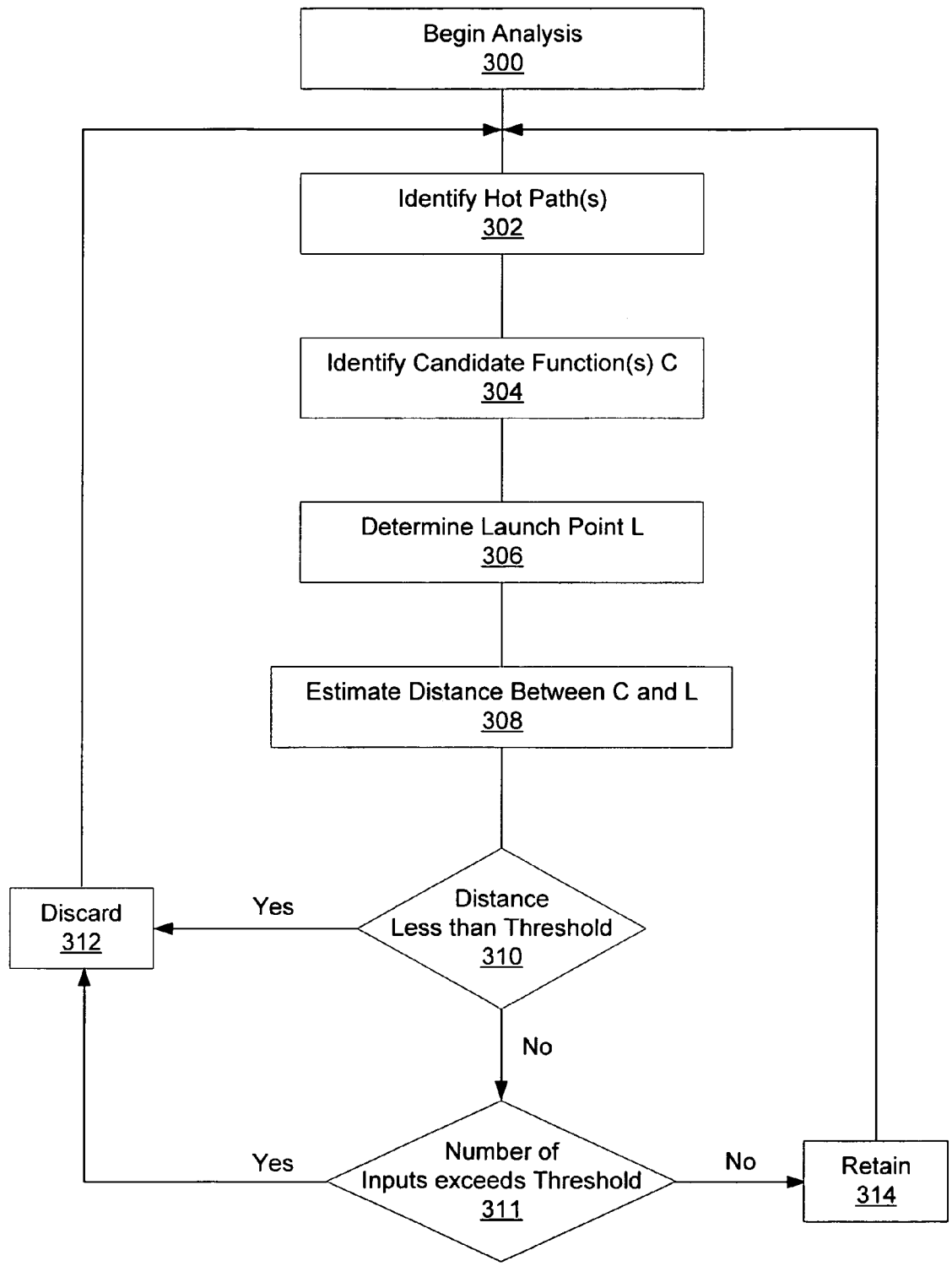
FIG. 3 depicts one embodiment of a method for identifying candidate code for helper thread execution.

Turning now to FIG. 3, one embodiment of a method for identifying candidate portions of code is shown. Generally speaking, candidate portions of code are sequences which may be suitable candidates for anticipatory execution by a helper thread. It is noted that such sequences may include branches. In the example shown, analysis begins (block 300) and one or more "hot" paths are identified (302). Hot paths may represent paths which are frequently taken, or other paths where it is believed anticipatory execution may be beneficial. For example, in one embodiment, a hot path is a path wherein if a point A is reached in an execution sequence, then a later point B is likely to be arrived at later. Having identified a hot path, a candidate function C is identified (block 304). The candidate function C may correspond to an actual call to a function or method. Alternatively, a candidate function C may simply corresponds to a "chunk" or portion of code. Candidate functions may further be those functions which have relatively few outputs. In addition to explicitly defined outputs of a function or other portion of code, globally visible variables modified by the code may also be considered outputs. Further, in various embodiments, the number of such modifications relative to the work performed by the function may be considered as a factor in candidate selection. For example, if a particular function is too simple, it may be deemed not worth the effort or overhead required to have it executed by a helper thread.

Having identified the beginning of the function C in the code sequence (e.g., the function call itself), another earlier point in time is identified which may be referred to as the launch point L. The launch point L corresponds to an earlier point in time during execution when a main thread may notify the helper thread that it may begin execution of the function C. Various approaches may be utilized to determine the launch point L and will be discussed in greater detail below. Subsequent to determining the launch point L, a distance between the launch point L and the function call C is determined or estimated (block 308). For example, a count or estimate of a number of instructions separating the function call C from the earlier launch point L may be determined. If this distance is less than some predetermined threshold (decision block 310), this function C currently being examined as a candidate may be deemed a poor candidate and discarded (block 312). In one embodiment, a candidate which has a relatively short distance between a launch point L and call point C may be deemed a poor candidate because it is assumed the helper thread would have insufficient time to complete computation of the function C before the main thread reached the corresponding function call. The threshold for such a distance could be determined experimentally, analytically, or otherwise.

If the threshold is not exceeded (decision block 310), a further determination may be made as to the number of inputs for the corresponding portion of code C. In one embodiment, these inputs corresponds to input variables of a function call. However, as noted above, the function C need not be a function proper. In the case where the function C merely corresponds to an arbitrary code fragment, the "inputs" may correspond to those variables whose values control the final result of a computation. In other words, results produced by the code fragment are determined by the values of these "inputs". In decision block 311, a determination may be made as to whether the number of inputs exceeds some predetermined threshold. If the threshold is exceeded, the candidate may be discarded (block 312). A candidate function with a relatively large number of inputs may be discarded due an increased probability that too many of such inputs may be modified between the launch point L and the call point C. In other words, it may be difficult to predict with any degree of certainty the values all of the inputs will have when the point C is reached. However, if the threshold is not exceeded, then the candidate may be retained (314).

Figure 4:
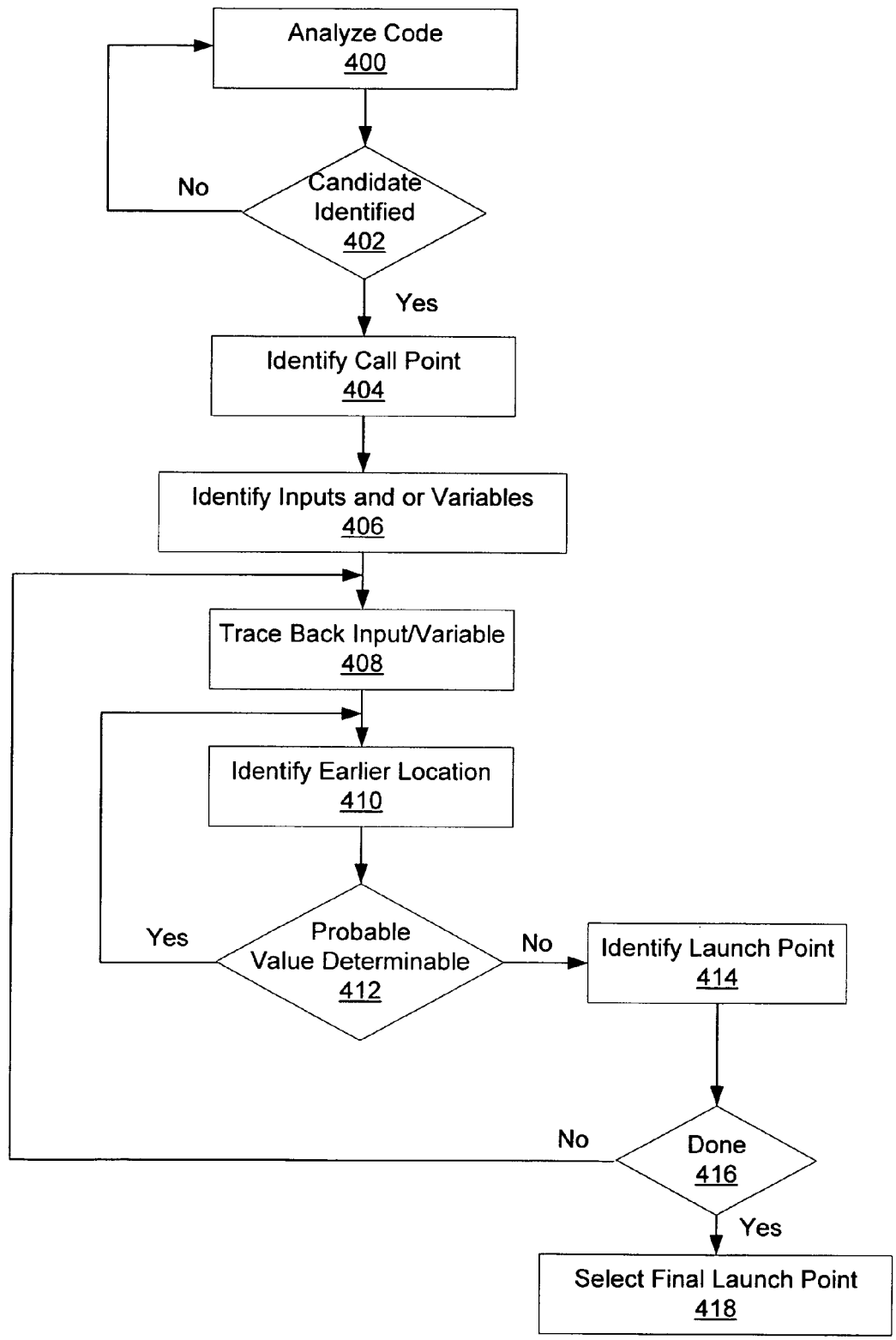
FIG. 4 depicts one embodiment of a method for identifying and selecting a launch point for a helper thread.

FIG. 4 illustrates one embodiment of a method for determining a launch point L of a candidate function. As before, analysis proceeds (or is proceeding) (block 400), and a candidate is identified (decision block 402). After identifying the call point C of the candidate (block 404), the inputs for the function C are identified (block 406). Each of the input variables may then be traced back through the execution sequence to earlier points in time (block 408). Having identified an earlier point in time (block 410), a determination is made as to whether a value of the input variable may be determined or predicted at the earlier point in time. For example, if there are no changes to the variable between the earlier point in time and the function call, then a value of the input at the earlier point in time is no different and may be deemed to be known with absolute certainty. Alternatively, if there are few or only conditional changes to the input variable between the earlier point in time and the function call, then a value of the input variable may be deemed to be known with a relatively high degree of certainty. Various techniques using data flow analysis, value profiling, and so on, may be used in the analysis.

As used above, to "know" the value of an input variable generally means that if a value of the input variable at the earlier point in time is known, then its value at the later point in time is likewise known. As may be appreciated, the certainty of "knowing" the value of the input variable in advance is variable. In some cases the predicted value will be correct, while in others it will be incorrect. Therefore, the analysis generally includes some prediction, with varying degrees of confidence, that there will be no change in a value of an input variable from the earlier point in time to the function call.

If in decision block 412 the value of the input variable is deemed "known", then the input variable may be traced back further in the execution sequence (block 408) and the process repeated. In such an embodiment, the method may attempt to identify an earliest point in the execution sequence when a value of the input variable can be known with a desired level of certainty. When the test condition (decision block 412) fails and a value of the input variable is deemed to correspond to an unknown value, then the most recent successfully identified location may be selected as the launch point corresponding to that input variable (block 414). If there are no other input variables (decision block 416), then this launch point is selected as the final launch point for the function C. However, if there are other input variables, then the method returns to block 408 and the process is repeated for each of the other input variables. Once a launch point has been determined for each of the input variables, the final launch point for the function C is selected (block 418). In one embodiment, the launch point which traces back the least is selected as the launch point for the function C. This point may be selected as going back earlier in the execution sequence will render values of input variables at launch points later in the sequence "unknown" according to the process. Of course, in alternative embodiments, an earlier launch point could be selected as the final launch point if desired. For example, it may be determined that the increased risk of not accurately predicting or knowing values of all of the input variables is acceptable in a given circumstance. All such alternatives are contemplated.

In various embodiments, a function which has been identified for possible execution by a helper thread may be duplicated. In this manner, the helper thread has its own copy of the code to be executed. Various approaches to identifying such code portions are possible. For example, if a candidate function has a call point at a code offset of 0x100, then this offset may be used to identify the code. A corresponding launch point may then be inserted in the code which includes this identifier (i.e., 0x100). Alternatively, any type of mapping or aliasing may be used for identifying the location of such portions of code. A status which is maintained by the helper thread in a shared memory location may then also include such an identifier. A simple example of a status which may be maintained for a function foo(x, y, z) is shown in TABLE 1 below.

TABLE 1

| Variable | Value | Description |
|---|---|---|
| ID | 0x100 | An identifier for the portion of code |
| Status | Started | Helper thread status for this portion of code (e.g., Idle, Started, Done) |
| Inputs | | A list of the inputs and their values as used by the helper thread |
| x | 10 | |
| y | 1235 | |
| z | 37 | |
| Outputs | | A list of the results/outputs of the computation |
| R1 | null | As the helper thread has not completed, the results values may be null or undefined |
| R2 | null | |
| R3 | null | |
| R4 | null | |

In the example status above, when a main thread reaches a call point for the function at offset 0x100, it may check the above depicted status. In this case, the status indicates the helper thread has started (Started) execution of the function, but is not done (DONE). Therefore, the main thread may simply forego any further examination of the status or results produced by the helper thread and execute the function itself. If the status indicated the helper thread was done, then the main thread may compare the input values used by the helper thread (10, 1235, and 37) to the actual values of such inputs. If they match, the main thread could then use the results (R1-R4) produced by the helper thread as appropriate.

Figure 5:
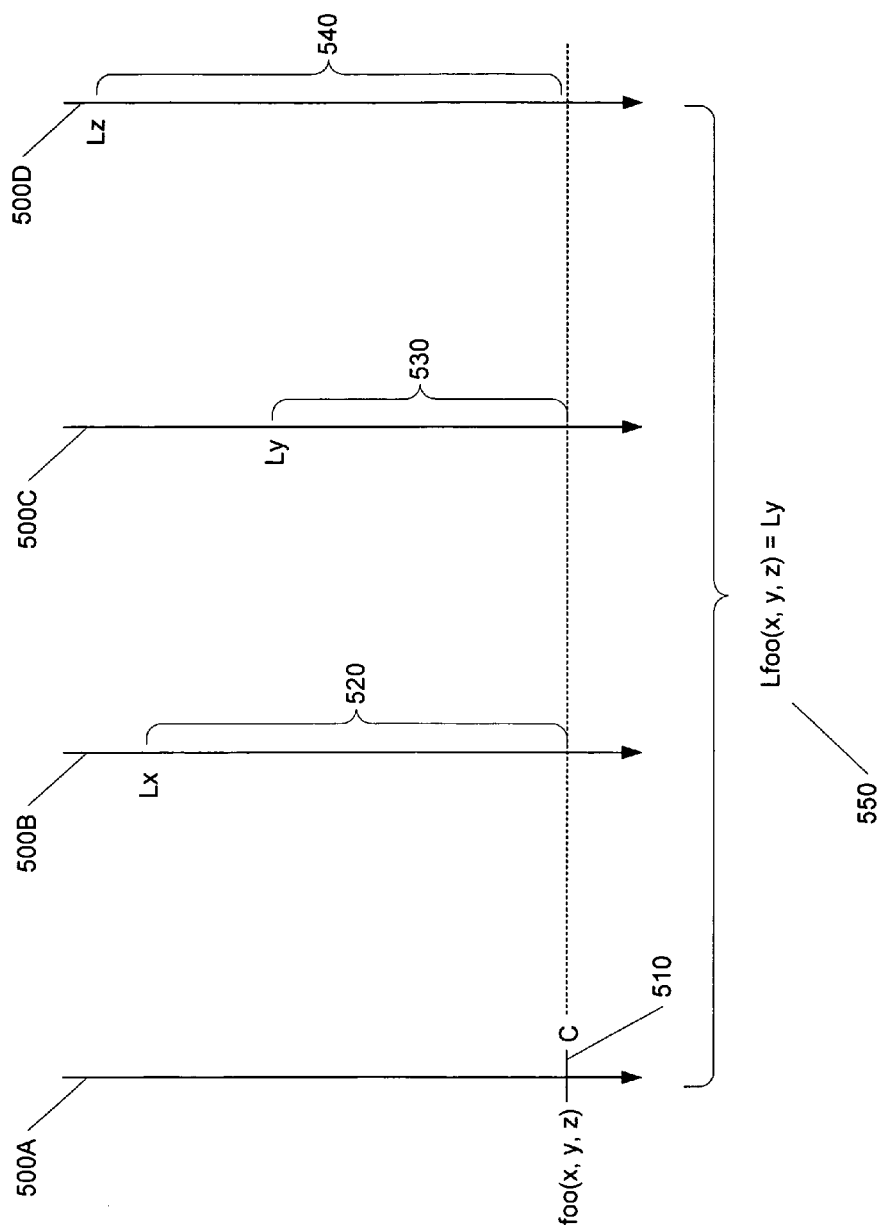
FIG. 5 provides a graphical depiction of the selection of a launch point.

FIG. 5 provides a graphical depiction of a method for selecting a function launch point. In the example shown, an instruction sequence is generally depicted by each of lines 500A-500D. Elements referred to herein with a particular reference number followed by a letter will be collectively referred to by the reference number alone. For example, lines 500A-500D may be collectively referred to as lines 500. Generally speaking, the length of each line may correspond to a distance, time, or number of instructions. As shown, a point in time C 510 is identified on line 500A. Point C 510 in this example corresponds-to a function call foo(x, y, z), wherein x, y and z are inputs to the function. Having identified the point C 510 and each of the inputs to the function, each input variable is traced back through the execution to locate an earlier point in time which represents a launch point which corresponds to the input variable. Accordingly, a launch point Lx is determined for input variable x as shown on line 500B. The distance (or length, or time) between Lx and the point C is shown as 520. Similarly, a launch point Ly for input variable y is shown on line 500C which has as distance 530. Finally, a launch point Lz is determined for input variable z on line 500D which has a distance 540. In this example, the launch point Ly is shown to have the smallest distance 530 and is therefore selected as the final launch point 550 for the function (i.e., Lfoo(x,y,z)=Ly).

Figure 6:
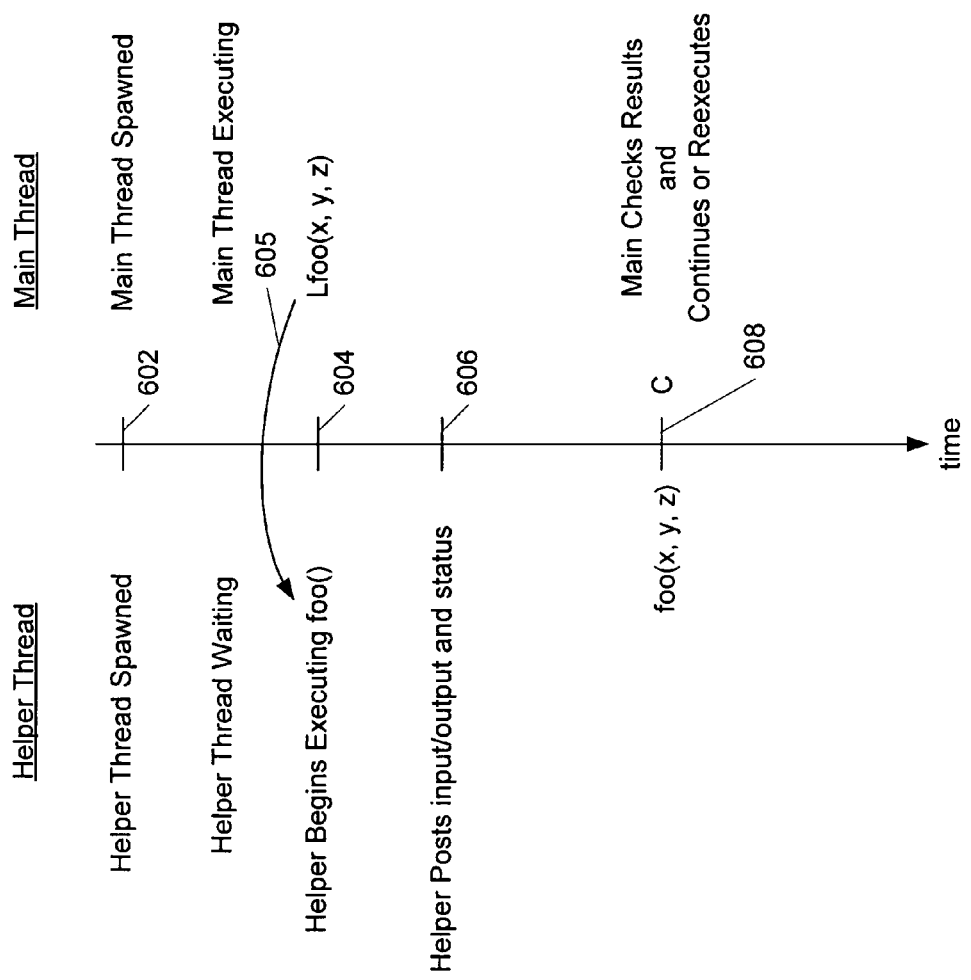
FIG. 6 depicts one embodiment of the launch and execution of a main thread and a helper thread.

FIG. 6 illustrates execution of a main thread and helper thread. On the left side of a time line, activities corresponding to a helper thread are shown. On the right side of the time line, activities corresponding to a main thread are shown. At a point in time 602, a main thread is spawned. The main thread, in turn, spawns a helper thread. Subsequent to that point in time 602, the main thread is executing and the helper thread is waiting. At a point in time 604, a launch point for a function foo( ) (Lfoo(x,y,z)) is reached by the main thread. The main thread then notifies 605 the helper thread that it may begin execution of foo( ), and the helper thread begins such execution. Upon initiating execution of foo( ), the helper thread may store status information indicating that it has begun execution of foo( ), the values of the input variables it is using, that it has not completed the execution, whether the values of the input variables were known with certainty, and any other suitable status related information.

At a later point in time 606, and perhaps at numerous other points in time, the helper thread posts/stores a status of execution of foo( ). Such status may, for example, include partial results. Upon completion, the status stored by the helper thread may generally include the final results and an indication that execution has completed. Subsequently, at a point in time 608, the main thread reaches the call point C 608 for the function foo( ). The main thread may then access and check the results and status posted by the helper thread. If the helper thread has completed and the input variables it used were correct, then the main thread may simply use the results posted by the helper thread and continue execution. If the helper thread has not completed execution of foo( ), then the main thread may ignore the results posted by the helper thread and continue to execute foo( ). In various embodiments, the main thread may notify the helper thread that it will not use the results of the helper thread (e.g., it has reached the call point C). For example, an indication in the shared buffer space could be used for such a purpose. Responsive to detecting such an indication, the helper thread may abort execution of the function. Alternatively, if the helper thread has already begun execution, the main thread could check the inputs used by the helper thread, and if they are correct, wait for the helper thread to complete execution and use its results. Numerous such alternatives are possible and are contemplated.

Exemplary System Embodiment

Figure 7:
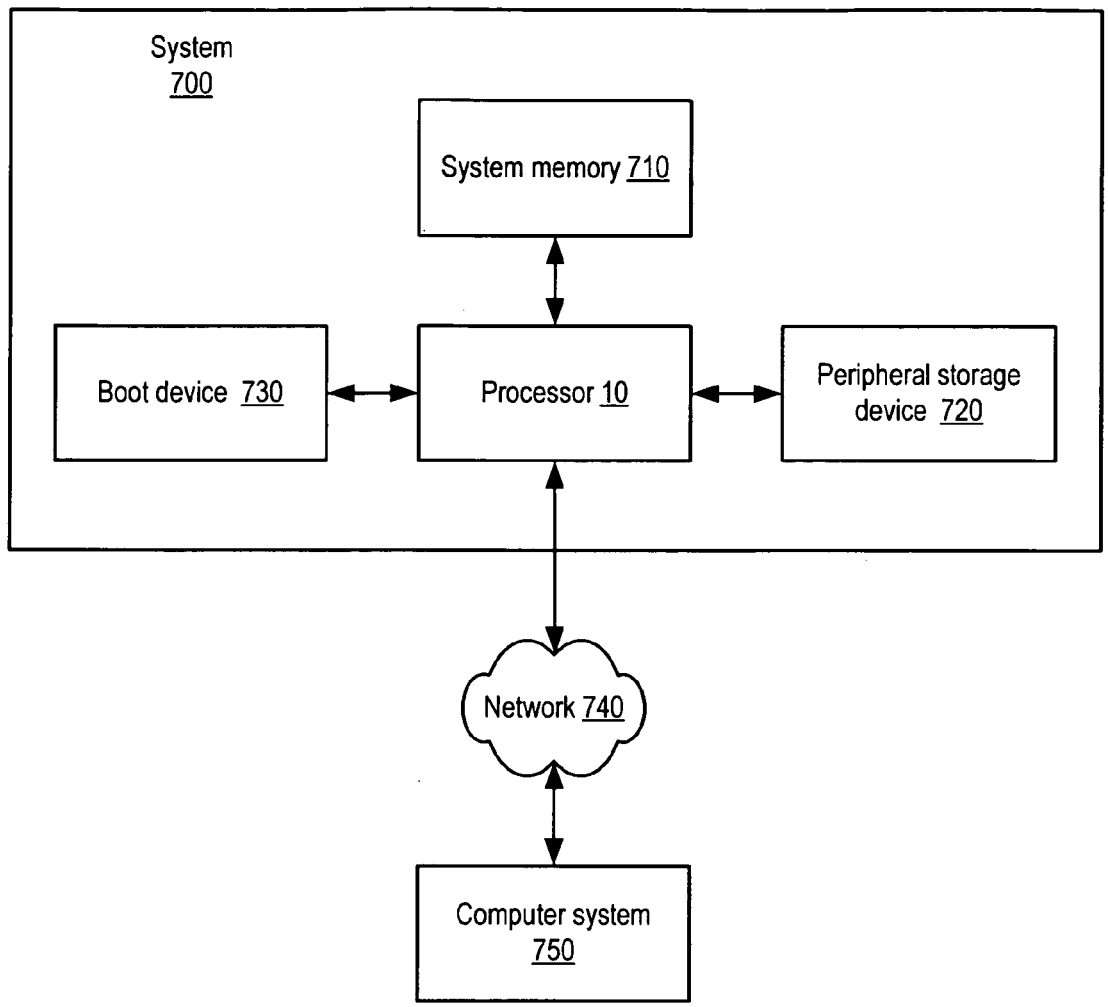
FIG. 7 is a block diagram illustrating one embodiment of a computing system.

As described above, in some embodiments processor 10 of FIG. 1 may be configured to interface with a number of external devices. One embodiment of a system including processor 10 is illustrated in FIG. 7. In the illustrated embodiment, system 700 includes an instance of processor 10 coupled to a system memory 710, a peripheral storage device 720 and a boot device 730. System 700 is coupled to a network 740, which is in turn coupled to another computer system 750. In some embodiments, system 700 may include more than one instance of the devices shown, such as more than one processor 10, for example. In various embodiments, system 700 may be configured as a rack-mountable server system, a standalone system, or in any other suitable form factor. In some embodiments, system 700 may be configured as a client system rather than a server system.

In various embodiments, system memory 710 may comprise any suitable type of system memory as described above, such as FB-DIMM, DDR/DDR2 SDRAM, or RDRAM®, for example. System memory 710 may include multiple discrete banks of memory controlled by discrete memory interfaces in embodiments of processor 10 configured to provide multiple memory interfaces 130. Also, in some embodiments system memory 710 may include multiple different types of memory.

Peripheral storage device 720, in various embodiments, may include support for magnetic, optical, or solid-state storage media such as hard drives, optical disks, nonvolatile RAM devices, etc. In some embodiments, peripheral storage device 720 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 730 may include a device such as an FPGA or ASIC configured to coordinate initialization and boot of processor 10, such as from a power-on reset state. Additionally, in some embodiments boot device 730 may include a secondary computer system configured to allow access to administrative functions such as debug or test modes of processor 10.

Network 740 may include any suitable devices, media and/or protocol for interconnecting computer systems, such as wired or wireless Ethernet, for example. In various embodiments, network 740 may include local area networks (LANs), wide area networks (WANs), telecommunication networks, or other suitable types of networks. In some embodiments, computer system 750 may be similar to or identical in configuration to illustrated system 700, whereas in other embodiments, computer system 750 may be substantially differently configured. For example, computer system 750 may be a server system, a processor-based client system, a stateless "thin" client system, a mobile device, etc.

It is noted that the above described embodiments may comprise software. In such an embodiment, the program instructions which implement the methods and/or mechanisms may be conveyed or stored on a computer accessible medium. Numerous types of media which are configured to store program instructions are available and include hard disks, floppy disks, CD-ROM, DVD, flash memory, programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for using threads in executable code, the method comprising:
analyzing program code comprising a plurality of instructions;
identifying a candidate function within said program code;
determining a place within said program code to insert a launch point corresponding to said candidate function, said launch point corresponding to an execution point within the program code that precedes the candidate function;
inserting said launch point into the program code;
executing a first thread, said first thread comprising instructions of the program code;
the first thread providing an indication to a second thread that the second thread may begin execution of the function, responsive to the first thread detecting a said launch point during execution of the program code;
the second thread initiating execution of the function in response to the indication, the function including one or more inputs and the second thread using anticipated values for each of the one or more inputs; and the first thread using a results of said execution, in response to determining the anticipated values used by the second thread are correct;

wherein determining said place to insert said launch point comprises identifying an earliest point in an execution sequence of the program code when a value of the input variable can be known with a desired level of certainty.

2. The method as recited in claim 1, wherein the first thread does not use a results of said execution, in response to determining the anticipated values used by the helper thread are not correct.

3. The method as recited in claim 1, further comprising the first thread checking said anticipated values responsive to said first thread reaching a call point for the function.

4. The method as recited in claim 3, wherein determining whether said anticipated values are correct comprises comparing said anticipated values to values which each of the one or more inputs has when the first thread reaches said call point.

5. The method as recited in claim 1, wherein determining said place to insert said launch point, further comprises determining a distance between said launch point and a call point of the candidate function, wherein said distance is measured as a count or estimate of a number of instructions separating the call point from the launch point.

6. The method as recited in claim 1, wherein identifying each of the individual launch points comprises identifying an earlier point in the execution sequence wherein a value of a corresponding input when the first thread reaches a call point for the function is known with a desired degree of certainty.

7. The method as recited in claim 1, wherein the first thread does not use a results of said execution and executes said function, in response to determining the second thread has not completed execution of the function.

8. A multithreaded multicore processor comprising:
a memory;
a plurality of processing cores, wherein a first core of said cores is configured to execute a first thread, and a second core of said cores is configured to execute a second thread; and
a compiler configured to:
analyze program code comprising a plurality of instructions;
identify a candidate function within said program code;
determine a place within said program code to insert a launch point corresponding to said candidate function, said launch point corresponding to an execution point within the program code that precedes the candidate function;
insert said launch point into the program code;
wherein during execution of the program code, the first thread is configured to provide an indication to the second thread that the second thread may begin execution of the function, responsive to the first thread detecting a said launch point during execution of the program code;
wherein the second thread is configured to initiate execution of the function in response to the indication, the function including one or more inputs and the second thread using anticipated values for each of the one or more inputs; and
wherein the main thread is configured to use a results of said execution, in response to determining the anticipated values used by the second thread are correct;
wherein determining said place to insert said launch point comprises identifying an earliest point in an execution sequence of the program code when a value of the input variable can be known with a desired level of certainty.

9. The processor as recited in claim 8, wherein the first thread does not use a results of said execution, in response to determining the anticipated values used by the helper thread are not correct.

10. The processor as recited in claim 8, wherein the first thread is configured to check said anticipated values responsive to said first thread reaching a call point for the function.

11. The processor as recited in claim 10, wherein the first thread is configured to determine whether said anticipated values are correct by comparing said anticipated values to values which each of the one or more inputs has when the first thread reaches said call point.

12. The processor as recited in claim 8, wherein determining said place to insert said launch point, further comprises determining a distance between said launch point and a call point of the candidate function, wherein said distance is measured as a count or estimate of a number of instructions separating the call point from the launch point.

13. The processor as recited in claim 8, wherein identifying each of the individual launch points comprises identifying an earlier point in the execution sequence wherein a value of a corresponding input when the first thread reaches a call point for the function is known with a desired degree of certainty.

14. The processor as recited in claim 8, wherein the first thread does not use a results of said execution, in response to determining the second thread has not completed execution of the function.

15. A non-transitory computer readable storage medium comprising program instructions, said program instructions being executable to:
analyze program code comprising a plurality of instructions;
identify a candidate function within said program code;
determine a place within said program code to insert a launch point corresponding to said candidate function, said launch point corresponding to an execution point within the program code that precedes the candidate function;
insert said launch point into the program code;
execute a first thread, said first thread comprising instructions of the program code;
cause the first thread to provide an indication to a second thread that the second thread may begin execution of the function, responsive to the first thread detecting a said launch point during execution of the program code;
cause the second thread to initiate execution of the function in response to the indication, the function including one or more inputs and the second thread using anticipated values for each of the one or more inputs; and
cause the first thread to use a results of said execution, in response to determining the anticipated values used by the second thread are correct;
wherein determining said place to insert said launch point comprises identifying an earliest point in an execution sequence of the program code when a value of the input variable can be known with a desired level of certainty.

16. The non-transitory computer readable storage medium as recited in claim 15, wherein the first thread does not use a results of said execution, in response to determining the anticipated values used by the helper thread are not correct.

17. The non-transitory computer readable storage medium as recited in claim 15, wherein the instructions are further operable to cause the first thread to check said anticipated values responsive to said first thread reaching a call point for the function.

18. The non-transitory computer readable storage medium as recited in claim 17, wherein in determining whether said anticipated values are correct, the instructions are further operable to compare said anticipated values to values which each of the one or more inputs has when the first thread reaches said call point.

19. The non-transitory computer readable storage medium as recited in claim 15, wherein to determine said place to insert said launch point said instructions are further operable to determine a distance between said launch point and a call point of the candidate function, wherein said distance is measured as a count or estimate of a number of instructions separating the call point from the launch point.

20. The non-transitory computer readable storage medium as recited in claim 15, wherein the first thread does not use a results of said execution, in response to determining the second thread has not completed execution of the function.

* * * * *

UNITED STATES PATENT AND TRADEMARK OFFICE
CERTIFICATE OF CORRECTION

PATENT NO. : 8,595,744 B2
APPLICATION NO. : 11/436948
DATED : November 26, 2013
INVENTOR(S) : Partha P. Tirumalai Page 1 of 1

It is certified that error appears in the above-identified patent and that said Letters Patent is hereby corrected as shown below:

In the Claims:

Claim 1, Column 12, Line 61, please delete "detecting a said" and substitute -- detecting said --

Claim 8, Column 13, Lines 54-55, please delete "detecting a said" and substitute -- detecting said --

Signed and Sealed this
Eleventh Day of February, 2014

Michelle K. Lee
*Deputy Director of the United States Patent and Trademark Office*